(12) United States Patent
Hidaka et al.

(10) Patent No.: US 10,888,906 B2
(45) Date of Patent: Jan. 12, 2021

(54) METHOD OF MANUFACTURING PIERCER PLUG

(71) Applicant: Nippon Steel & Sumitomo Metal Corporation, Tokyo (JP)

(72) Inventors: Yasuyoshi Hidaka, Tokyo (JP); Yasuto Higashida, Tokyo (JP); Naoya Shirasawa, Tokyo (JP); Yuichi Yamanari, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 148 days.

(21) Appl. No.: 16/097,331

(22) PCT Filed: May 10, 2017

(86) PCT No.: PCT/JP2017/017763
§ 371 (c)(1),
(2) Date: Oct. 29, 2018

(87) PCT Pub. No.: WO2018/029926
PCT Pub. Date: Feb. 15, 2018

(65) Prior Publication Data
US 2019/0151917 A1 May 23, 2019

(30) Foreign Application Priority Data
Aug. 8, 2016 (JP) .................. 2016-155647

(51) Int. Cl.
*B21B 25/00* (2006.01)
*C22C 38/04* (2006.01)
(Continued)

(52) U.S. Cl.
CPC .............. *B21B 25/00* (2013.01); *B21B 19/04* (2013.01); *B23K 35/3033* (2013.01); *C21D 1/18* (2013.01);
(Continued)

(58) Field of Classification Search
CPC ...................................................... B21B 25/00
(Continued)

(56) References Cited

U.S. PATENT DOCUMENTS 3,655,244 A * 4/1972 Swisher ................. B25D 17/02
299/113
2015/0258591 A1 * 9/2015 Higashida ............... C23C 4/131
72/476

(Continued)

FOREIGN PATENT DOCUMENTS

EP 2875876 A1 5/2015
EP 3354361 A1 8/2018
(Continued)

*Primary Examiner* — Stefanie J Cohen
*Assistant Examiner* — Danielle M. Carda
(74) *Attorney, Agent, or Firm* — Banner & Witcoff, Ltd.

(57) ABSTRACT

A piercer plug having good base-material deformation resistance is provided. A method of manufacturing a piercer plug (10) includes the steps of; preparing a plug body (1) including a tip portion (11) and a cylindrical portion (12) having a hole (121) usable to attach a bar and located rearward of the tip portion (11); forming a build-up layer (2) on the surface of the tip portion (11); and heating the plug body (1) such that the temperature of the tip portion (11) with the build-up layer (2) formed thereon is not lower than the austenite transformation temperature and the temperature of the cylindrical portion (12) is lower than the austenite transformation temperature.

2 Claims, 9 Drawing Sheets

(51) Int. Cl.
| | |
|---|---|
| B21B 19/04 | (2006.01) |
| C21D 9/00 | (2006.01) |
| C22C 38/02 | (2006.01) |
| C22C 38/42 | (2006.01) |
| C22C 38/44 | (2006.01) |
| C23C 4/18 | (2006.01) |
| C21D 1/18 | (2006.01) |
| C21D 1/42 | (2006.01) |
| C23C 4/06 | (2016.01) |
| C23C 4/134 | (2016.01) |
| C23C 4/067 | (2016.01) |
| B23K 35/30 | (2006.01) |
| C22C 19/05 | (2006.01) |
| C23C 4/129 | (2016.01) |
| C23C 4/02 | (2006.01) |
| C23C 4/131 | (2016.01) |
| C23C 4/08 | (2016.01) |
| C21D 6/00 | (2006.01) |
| C22C 27/04 | (2006.01) |
| C22C 38/00 | (2006.01) |
| C22C 38/52 | (2006.01) |
| C22C 38/54 | (2006.01) |

(52) U.S. Cl.
CPC .............. *C21D 1/42* (2013.01); *C21D 6/004* (2013.01); *C21D 6/005* (2013.01); *C21D 6/007* (2013.01); *C21D 6/008* (2013.01); *C21D 9/0068* (2013.01); *C22C 19/057* (2013.01); *C22C 27/04* (2013.01); *C22C 38/002* (2013.01); *C22C 38/02* (2013.01); *C22C 38/04* (2013.01); *C22C 38/42* (2013.01); *C22C 38/44* (2013.01); *C22C 38/52* (2013.01); *C22C 38/54* (2013.01); *C23C 4/02* (2013.01); *C23C 4/06* (2013.01); *C23C 4/067* (2016.01); *C23C 4/08* (2013.01); *C23C 4/129* (2016.01); *C23C 4/131* (2016.01); *C23C 4/134* (2016.01); *C23C 4/18* (2013.01); *Y02P 10/25* (2015.11)

(58) Field of Classification Search
USPC ........................................................ 148/530
See application file for complete search history.

(56) References Cited

U.S. PATENT DOCUMENTS

| | | | |
|---|---|---|---|
| 2018/0354008 A1* | 12/2018 | Hidaka | ................... B21B 25/00 |
| 2020/0263282 A1* | 8/2020 | Hidaka | ................... C21D 9/00 |

FOREIGN PATENT DOCUMENTS

| | | |
|---|---|---|
| JP | H04351508 A | 12/1992 |
| JP | H05171340 A | 7/1993 |
| JP | 2007326554 A | 12/2007 |
| WO | 2013153878 A1 | 10/2013 |
| WO | 2013161489 A1 | 10/2013 |
| WO | 2014109180 A1 | 7/2014 |

* cited by examiner

METHOD OF MANUFACTURING PIERCER PLUG

RELATED APPLICATION DATA

This application is a National Stage Application under 35 U.S.C. 371 of co-pending PCT application number PCT/JP2017/017763 designating the United States and filed May 10, 2017; which claims the benefit of JP application number 2016-155647 and filed Aug. 8, 2016 each of which are hereby incorporated by reference in their entireties.

TECHNICAL FIELD

The present disclosure relates to a method of manufacturing a piercer plug.

BACKGROUND ART

The Mannesmann pipe-making method is widely used as a method of producing seamless pipe. The Mannesmann pipe-making method involves piercing/rolling of a hot billet using a piercing mill. The piercing mill includes a pair of skewed rolls and a piercer plug. The piercer plug is positioned on a pass line between the skewed rolls. The piercing mill uses the skewed rolls to circumferentially rotate the billet while pushing it onto the piercer plug, and performs piercing/rolling on the billet to provide a hollow shell.

During piercing/rolling, the piercer plug is exposed to an extremely harsh environment. The piercer plug receives intense heat and high surface pressure from the object subjected to the piercing/rolling, i.e. billet. Typically, an oxide scale coating or sprayed coating is formed on the surface of the base material of the piercer plug. Due to the harsh piercing, this coating may wear or peel off the surface of the base material, i.e. wear off. When the coating is worn out, the use of the piercer plug may be interrupted and a coating may be reproduced to allow the piercer plug to be reused. However, when the amount of deformation and/or wear of the base material exceeds a permissible level, the piercer plug cannot be reused. Deformation and/or wear (hereinafter collectively referred to as deformation) of the base material tends to occur especially at the tip of the piercer plug.

WO 2013/153878 and WO 2013/161489 each disclose a piercer plug with a build-up layer formed on the tip portion. In these piercer plugs, the build-up layer, which has a high hot strength, prevents erosion of the tip portion.

DISCLOSURE OF THE INVENTION

In each of the piercer plugs of WO 2013/153878 and WO 2013/161489, a build-up layer is provided such that the outermost layer has increased hardness. However, the heat input during the formation of the build-up layer may produce variations in hardness in the interior of the base material of the piercer plug. If such a piercer plug is used to perform piercing/rolling under extremely harsh conditions, such as when the billet is made of an Ni-based high alloy, the base material of the piercer plug may be deformed.

An object of the present disclosure is to provide a piercer plug having good base-material deformation resistance.

A method of manufacturing a piercer plug according to the present disclosure includes the steps of preparing a plug body including a tip portion and a cylindrical portion having a hole usable to attach a bar and located rearward of the tip portion; forming a build-up layer on a surface of the tip portion; and heating the plug body such that a temperature of the tip portion with the build-up layer formed thereon is not lower than an austenite transformation temperature and a temperature of the cylindrical portion is lower than the austenite transformation temperature.

The present disclosure provides a piercer plug having good base-material deformation resistance.

EMBODIMENTS FOR CARRYING OUT THE INVENTION

Figure 1:
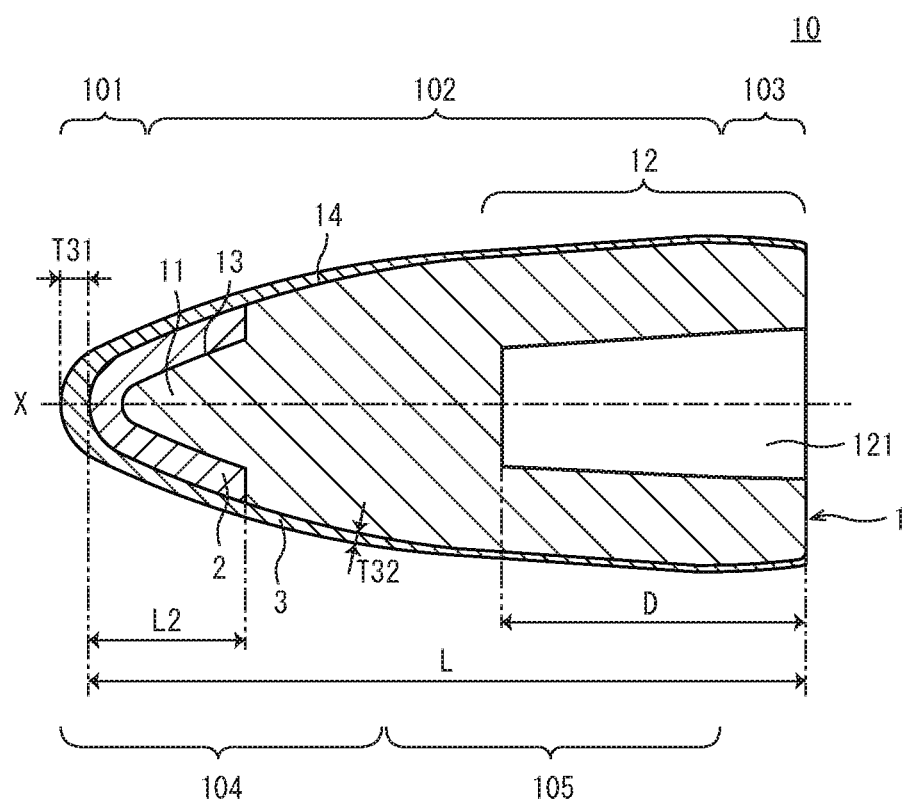
FIG. 1 is a longitudinal cross-sectional view of a piercer plug produced by the manufacturing method of an embodiment.

A method of manufacturing a piercer plug according to the present embodiment includes the steps of: preparing a plug body including a tip portion and a cylindrical portion having a hole usable to attach a bar and located rearward of the tip portion; forming a build-up layer on a surface of the tip portion; and heating the plug body such that a temperature of the tip portion with the build-up layer formed thereon is not lower than an austenite transformation temperature and a temperature of the cylindrical portion is lower than the austenite transformation temperature (first arrangement).

According to the first arrangement, a build-up layer is first formed on the tip portion of the plug body before the tip portion is quenched by heating it to the austenite transformation temperature or higher, thereby hardening it. That is, even if variations in heat input during the formation of the build-up layer have produced variations in the hardness of the plug body, the subsequent quenching increases the hardness of the tip portion of the plug body which particularly tends to be deformed. This will prevent deformation of portions of the plug body located just inside the build-up layer due to high surface pressures during piercing/rolling, thereby providing good base-material deformation resistance.

The above-described manufacturing method may further include the step of forming a sprayed coating on a surface of the plug body with the build-up layer formed thereon, wherein the step of forming occurs before the step of heating (second arrangement).

Generally, the larger the thickness of the coating on the piercer plug, the more likely that the coating peels off the base material. According to the second arrangement, the plug body is heated when the build-up layer and sprayed coating have been formed. Thus, diffusion may occur between the sprayed coating and the plug body and build-up layer, thereby improving the adhesiveness of the sprayed coating. This makes it possible to increase the thickness of the sprayed coating, thereby further preventing deformation of the base material.

The build-up layer may be made of an Ni—W alloy (third arrangement).

Embodiments will be described below with reference to the drawings. The same and corresponding elements in the drawings are labeled with the same reference characters and their description will not be repeated. For ease of explanation, some elements may be simplified or shown schematically in the drawings, or some elements may not be shown.

[Construction of Piercer Plug]

FIG. 1 is a longitudinal cross-sectional view of a piercer plug 10 produced by the manufacturing method of the present embodiment. Longitudinal cross-sectional view means a cross section containing the central axis X of the piercer plug 10, and transverse cross-sectional view means a cross section perpendicular to the central axis X. The direction in which the central axis X of the piercer plug 10 extends will be referred to as longitudinal direction or axial direction.

The piercer plug 10 is shaped like a projectile. A transverse cross section of the piercer plug 10 is generally circular in shape. The outer diameter of the piercer plug 10 gradually increases as it goes from one end of the plug as determined along the axial direction toward the other end. In the piercer plug 10, the direction toward small-diameter portions will be hereinafter referred to as toward the front/tip or forward, while the direction toward large-diameter portions will be referred to as rear(ward).

The piercer plug 10 is made up of a tip portion 101, a trunk portion 102 and a roll-off portion 103. The tip portion 101, trunk portion 102 and roll-off portion 103 are arranged in this order, beginning with the front of the piercer plug 10 and going toward the rear. Alternatively, the piercer plug 10 may not include the roll-off portion 103.

The portion of the piercer plug 10 excluding the roll-off portion 103 is divided into a rolling portion 104 and a reeling portion 105. The rolling portion 104 receives a major part of the wall-thickness depression during piercing/rolling. The reeling portion 105 is located rearward of the rolling portion 104. The reeling portion 105 finishes the wall thickness of the hollow shell (or simply shell) during piercing/rolling.

The piercer plug 10 includes a plug body 1, a build-up layer 2 and a sprayed coating 3.

(Plug Body)

The plug body 1 includes a tip portion 11 and a cylindrical portion 12. The cylindrical portion 12 is located rearward of the tip portion. The cylindrical portion 12 includes a hole 121.

The hole 121 is used to attach a bar, described below, to the piercer plug 10. The hole 121 is open on the rear end surface of the plug body 1. That is, the rear portion of the plug body 1 is cylindrical in shape due to the presence of the hole 121.

The front end of the cylindrical portion 12 is located 0.1×D [mm] forward from the front end of the hole 121, where D [mm] is the depth of the hole 121. The depth D of the hole 121 is the distance between the front end (or bottom) of the hole 121 and the rear end (or open end) as measured in the axial direction of the piercer plug 10. The cylindrical portion 12 is the portion of the plug body 1 that is defined by the position at 0.1×D [mm] forward of the bottom of the hole 121 and the rear end of the plug body 1.

In the plug body 1, the tip portion 11 is harder than the cylindrical portion 12. The tip portion 11 has a Vickers hardness of 300 Hv or higher, for example. The Vickers hardness of the cylindrical portion 12 is preferably in the range of 220 to 260 Hv, but may be below 220 Hv. Vickers hardness is measured at a cross section of the plug body 1 along the axial direction in accordance with JIS Z 2244 (2009) using a test force of 1 kgf. Based on Charpy impact testing using full-size test specimens in accordance with JIS Z 2242 (2005), the cylindrical portion 12 has an impact value of 20 J/cm$^2$ or higher at 20° C.

The surface of the plug body 1 is divided into a region 13 and a region 14. The region 13 is the portion of the surface of the plug body 1 that is covered with a build-up layer 2, described below. The region 14 is the portion of the surface of the plug body 1 that is not covered with the build-up layer 2. The diameter of the front end of the region 14 is larger than the diameter of the rear end of the region 13. That is, the surface of the plug body 1 includes a step between the front region 13 and the rear region 14.

The plug body 1 is made of a steel whose hardness can be improved by heat treatment, that is, a hardenable steel. The material of the plug body 1 preferably contains characteristic elements in the ranges specified below in addition of iron (Fe) and impurities. The material of the plug body 1 may contain elements other than those listed below. In the following description, "%" for the content of an element means mass %.

C: 0.08 to 0.5%

Carbon (C) is a component effective in improving high-temperature strength. C is ineffective if the C content is not higher than 0.08%. If the C content exceeds 0.5%, the hardness becomes too high. Also, it becomes difficult to control the conditions of precipitation of carbides. In view of this, the C content should be in the range of 0.08 to 0.5%. The C content is preferably not higher than 0.3%, and more preferably not higher than 0.2%. The C content is preferably not lower than 0.09%, and more preferably not lower than 0.1%.

Si: 0.1 to 1.0%

Silicon (Si) is a component effective in deoxidization. Si is substantially ineffective if the Si content is not higher than 0.1%. If the Si content exceeds 1.0%, the toughness of the material begins to deteriorate. In view of this, the Si content should be in the range of 0.1 to 1.0%. The Si content is preferably not higher than 0.9%, and more preferably not higher than 0.8%. The Si content is preferably not lower than 0.2%, and more preferably not lower than 0.3%.

Mn: 0.2 to 1.5%

Manganese (Mn) stabilizes austenite at high temperatures. That is, Mn prevents production of δ-ferrite and thus prevents decrease in toughness. The effects of Mn are present if the Mn content is not lower than 0.2%. However, if the Mn content exceeds 1.5%, the hardness becomes too high, and quench cracking is likely to occur after piercing. In view of this, Mn content should be in the range of 0.2 to 1.5%. The Mn content is preferably not higher than 1.4%, and more preferably not higher than 1.3%. The Mn content is preferably not lower than 0.3%, and more preferably not lower than 0.4%.

The material of the plug body 1 may contain one or more of the optional elements listed below. The material of the plug body 1 may contain one or some or all of the optional elements. The material of the plug body 1 may contain none of the optional elements.

Ni: 0 to 2.0%

Nickel (Ni) is effective in improving the toughness of quenched phase formed in the surface layer of the plug. The material is substantially saturated in terms of Ni effectiveness when the Ni content is 2.0%. Adding more Ni means increased costs. In view of this, the Ni content should be in the range of 0 to 2.0%. The Ni content is preferably not higher than 1.9%, and more preferably not higher than 1.8%. The Ni content is preferably not lower than 0.2%, and more preferably not lower than 0.3%.

Mo: 0 to 4.0%; W: 0 to 4.0%

Molybdenum (Mo) and tungsten (W) are replaceable elements. These elements are effective in improving high-temperature strength, and increasing the $Ac_1$ point to reduce the hardened portions of the surface after piercing. However, if the total amount exceeds 8.0%, ferrite remains even at high temperatures, reducing strength and toughness. In view of this, the total amount should be not higher than 8.0%. The Mo content is preferably not higher than 3.9%, and more preferably not higher than 3.8%. The Mo content is preferably not lower than 0.75%, and more preferably not lower than 0.8%. The W content is preferably not higher than 3.9%, and more preferably not higher than 3.8%. The W content is preferably not higher than 0.75%, and more preferably not lower than 0.8%.

Cu: 0 to 0.5%

Copper (Cu) is an austenite stabilizing element, and effective in improving the toughness of the plug surface layer that has been held at high temperatures during piercing and become austenite. In view of this, the Cu content should be in the range of 0 to 0.5%.

B: 0 to 0.2%; Nb: 0 to 1.0%; V: 0 to 1.0%; Cr: 0 to 10.0%; Ti: 0 to 1.0%

If a slight amount of boron (B) is contained, it is effective in increasing the strength of grain boundaries. However, if the B content exceeds 0.2%, embrittled phase precipitates, deteriorating toughness. In view of this, the B content should be in the range of 0 to 0.2%. If slight amounts of niobium (Nb), vanadium (V), chromium (Cr) and titanium (Ti) are contained, they are effective in making crystal grains finer. In view of this, each of the contents of Nb, V and Ti should be in the range of 0 to 1.0%, and the Cr content should be in the range of 0 to 10.0%.

In addition, to desulfurize the material of the plug body 1, small amounts of calcium (Ca) and/or rare earth elements (REMs) may be added to the material as necessary.

(Build-Up Layer)

Figure 2:
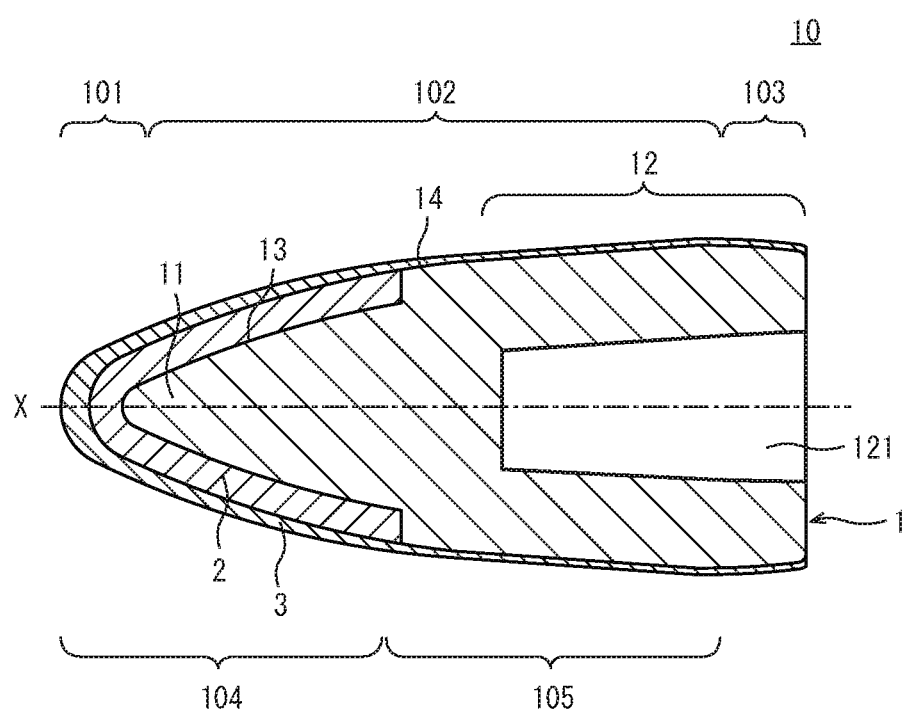
FIG. 2 is a longitudinal cross-sectional view of a piercer plug having a different construction than the piercer plug shown in FIG. 1.

The build-up layer 2 is formed on the surface of the tip portion 11 of the plug body 1. The build-up layer 2 covers at least the entire surface of the tip portion 11. As shown in FIG. 2, the build-up layer 2 may extend to a position rearward of the tip portion 11. The build-up layer 2 may extend to near the central portion of the plug body 1 as determined along the axial direction. The rear end of the build-up layer 2 is located forward of the front end of the cylindrical portion 12.

Returning to FIG. 1, as measured in the axial direction, the length of the build-up layer 2, L2, is not smaller than 0.15×L [mm], where L [mm] is the length of the piercer plug 10. The length L2 of the build-up layer 2 is not larger than 0.50×L [mm]. In the present embodiment, the length L of the piercer plug 1 does not include the thickness of the sprayed coating 3. That is, the length L of the piercer plug 10 is the distance between the front end of the build-up layer 2 and the rear end of the plug body 1 as measured in the axial direction.

The build-up layer 2 is formed on the region 13, i.e. portion of the surface of the plug body 1 that has smaller diameters. The surface of the build-up layer 2 smoothly connects with the region 14 of the surface of the plug body 1. That is, the surface of the build-up layer 2 connects with the region 14 of the surface of the plug body 1 without a step.

The thickness of the build-up layer 2 is preferably not smaller than 1.0 mm, and more preferably not smaller than 3.0 mm. The thickness of the build-up layer 2 is preferably not larger than 8.0 mm, and more preferably not larger than 6.0 mm.

Figure 3:
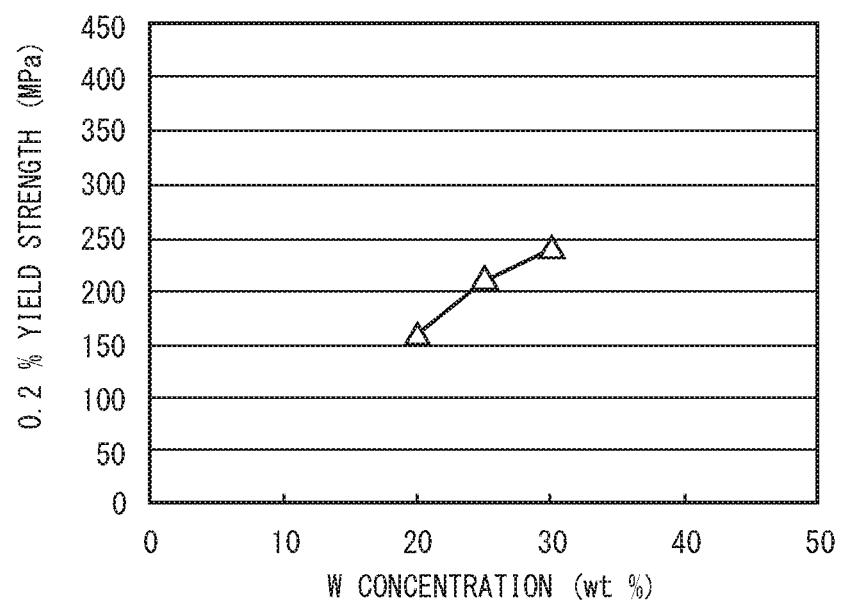
FIG. 3 is a graph showing the relationship between the 0.2% yield strength and W content of an Ni—W alloy at 1250° C.

The build-up layer 2 is preferably made of an Ni—W alloy. If this is the case, the W content is preferably in the range of 25 to 50 mass %, and more preferably in the range of 25 to 45 mass %. The reasons therefor will be provided with reference to FIG. 3. FIG. 3 is a graph showing the relationship between the 0.2% yield strength and W content of an Ni—W alloy at 1250° C. In the following description, "%" for the content of an element means mass %.

The build-up layer 2 is required to have a 0.2% yield strength of at least 200 MPa at 1250° C. The larger the W concentration (or content), the larger the 0.2% yield strength becomes. FIG. 3 demonstrates that the 0.2% yield strength at 1250° C. exceeds 200 MPa when the W content is 25% or higher. Thus, if the build-up layer 2 is made of an Ni—W content, the W content is preferably not lower than 25%.

If the W content in an Ni—W alloy exceeds 50%, it becomes difficult to cause W to dissolve. Thus, if the build-up layer 2 is made of an Ni—W alloy, the W content is preferably not higher than 50%, and more preferably not higher than 45%.

Cr may be added to the Ni—W alloy. Adding 1 to 5% Cr to the Ni—W alloy will improve toughness.

In view of the above discussion, the preferable chemical composition of the build-up layer 2 is W in 25 to 50%, more preferably 25 to 45%, Cr in 1 to 5%, and the balance, which is made up of Ni and impurities.

(Sprayed Coating)

Returning to FIG. 1, the sprayed coating 3 is formed on the surface of the plug body 1 with the build-up layer 2 formed thereon. In the implementation of FIG. 1, the sprayed coating 3 covers the entire surface of the build-up layer 2 and the portions of the sides of the plug body 1 that are not covered with the build-up layer 2. That is, the sprayed coating 3 is formed on the surface of the build-up layer 2 and plug body 1 so as to expose only the rear end surface of the plug body 1.

The roll-off portion 103 need not be covered with the sprayed coating 3. That is, the sprayed coating 3 is only required to cover at least the portions of the piercer plug 10 that begins with the tip and ends with the rear end of the trunk portion 102.

Preferably, the thickness of the portions of the sprayed coating 3 that are located on the surface of the build-up layer 2 is larger than the thickness of the portions of the sprayed coating 3 that are located on the region 14 of the plug body 1. The thickness of the sprayed coating 3 is the largest at the tip of the piercer plug 10, for example. The thickness of the portions of the sprayed coating 3 that cover the tip of the piercer plug 10, T31, may be in the range of 0.6 to 3.0 mm, for example.

The thicknesses of the portions of the sprayed coating 3 that are located on the region 14 of the plug body 1, T32, may be in the range of 0.1 to 0.8 mm, for example. The thickness T32 is the thickness of the sprayed coating 3 measured at any position rearward of the build-up layer 2.

Preferably, the sprayed coating 3 is mainly composed of iron and iron oxides. However, the sprayed coating 3 may contain slight amounts of elements and/or compounds other than iron and iron oxides.

[Method of Using Piercer Plug]

Figure 4:
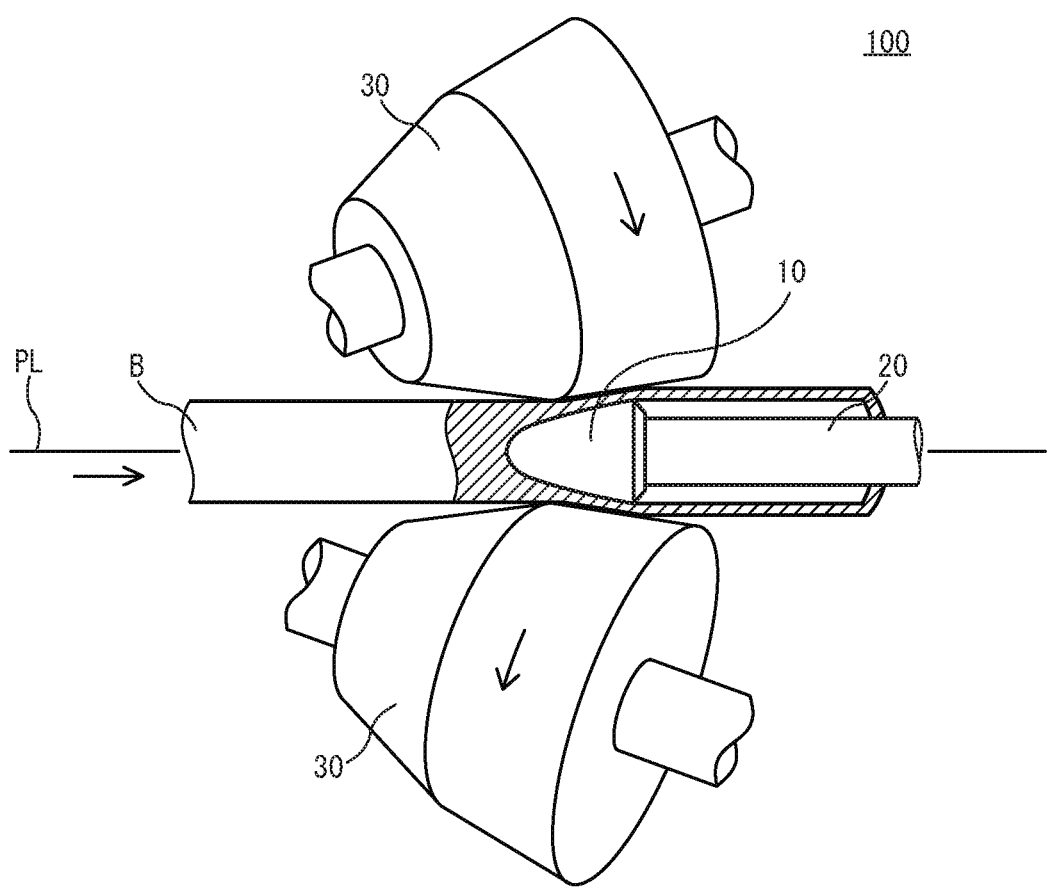
FIG. 4 is a schematic view of a piercing mill incorporating the piercer plug shown in FIG. 1 or 2.

The piercer plug 10 having the above-described construction is used to perform piercing/rolling. FIG. 4 is a schematic view of a piercing mill 100 incorporating the piercer plug 10. As shown in FIG. 4, before piercing/rolling, the end portion of a bar (or mandrel) 20 is inserted into the hole 121 (FIGS. 1 and 2) in the piercer plug 10 to attach the bar 20 to the piercer plug 10. The piercer plug 10 is positioned on the pass line PL between a pair of skewed rolls 30. The piercer plug 10 is pushed into the central portion of a billet B. In this way, the billet B undergoes piercing/rolling to provide a hollow shell.

[Method of Manufacturing Piercer Plug]

A method of manufacturing the piercer plug 10 will be described below. The manufacturing method according to the present embodiment includes the steps of: preparing a plug body 1; forming a build-up layer 2; forming a sprayed coating 3; heating the plug body 1 with the build-up layer 2 and sprayed coating 3 formed thereon; and cooling the heated plug body 1.

(Preparation of Plug Body)

To produce a piercer plug 10, a plug body 1 is first prepared. The plug body 1 may be fabricated by forging, for example.

(Formation of Build-Up Layer)

Subsequently, a build-up layer 2 is formed on the surface of the tip portion 11 of the plug body 1. Thus, at least the tip portion 11 of the plug body 1 is covered with the build-up layer 2. The build-up layer 2 is formed in such a way that the length L2 as measured in the axial direction is 15 to 50% of the length L of the plug body 1 after the formation of the build-up layer 2 ($0.15 \times L < L2 < 0.50 \times L$).

The build-up layer 2 may be formed by a known build-up welding method such as plasma transferred arc (PTA) welding, metal inert gas (MIG) welding, or tungsten inert gas (TIG) welding.

(Formation of Sprayed Coating)

Subsequently, a sprayed coating 3 is formed on the surface of the plug body 1 with the build-up layer 2 formed thereon. According to the present embodiment, the sprayed coating 3 covers the portion of the surface of the plug body 1 with the build-up layer 2 that excludes the rear end surface. However, the roll-off portion 103 need not be covered with the sprayed coating 3. The sprayed coating 3 is only required to cover at least the entire rolling portion 104 and reeling portion 105.

The sprayed coating 3 may be formed by a known spraying method such as arc spraying, plasma spraying, flame spraying, or high-speed flame spraying.

If the sprayed coating 3 is formed by arc spraying, the wire to be used for spraying may be iron wire. The iron wire is a wire of a carbon steel mainly composed of Fe. Typically, the iron wire is a wire of a so-called common steel, which is mainly composed of Fe and contains C, Si, Mn and impurities, but it may also contain elements such as W. The iron wire may be used to perform arc spraying to form a sprayed coating 3 containing iron and iron oxides.

(Heating)

Subsequently, the plug body 1 with the build-up layer 2 and sprayed coating 3 formed thereon is heated. More specifically, the plug body 1 is heated such that the temperature of the tip portion 11 becomes not lower than the austenite transformation temperature ($A_{C3}$ Point). During the heating of the plug body 1, the temperature of the cylindrical portion 12 is maintained below the $A_{C3}$ point.

For the heating of the plug body 1, only portions of the plug body 1 with the build-up layer 2 and sprayed coating 3 that include the tip portion 11 and do not include the cylindrical portion 12 may be heated. Alternatively, the entire plug body 1 with the build-up layer 2 and sprayed coating 3 formed thereon may be heated in such a way that there is a difference in temperature between the tip portion 11 and cylindrical portion 12.

Examples of how to heat the plug body 1 with the build-up layer 2 and sprayed coating 3 formed thereon will be described with reference to FIGS. 5 and 6. For ease of explanation, the plug body 1 with the build-up layer 2 and sprayed coating 3 formed thereon, i.e. an unfinished piercer plug before the completion of the heating step and the cooling step, described below, will be hereinafter referred to as plug 10a.

Figure 5:
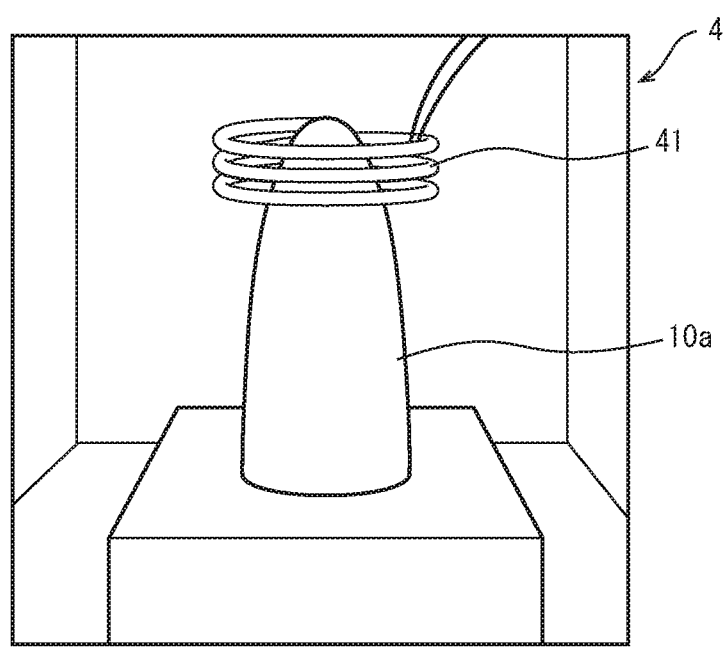
FIG. 5 is a schematic view of a heating apparatus.

In the example of FIG. 5, a high-frequency coil 41 is attached to the outer periphery of the tip portion of the plug 10a, and the plug body 1 is placed in a heating apparatus 4 containing an Ar atmosphere. Then, the coil 41 is used to perform high-frequency heating on the tip portion of the plug 10a at a temperature of 1000 to 1200° C. The heating is only required to be done for a time sufficient to cause the tip portion to be hardened. If high-frequency heating is used, the heating only needs to be done for several seconds or longer at a temperature that is not lower than the $A_{C3}$ point; however, to achieve industrial stability, the heating time is preferably 20 seconds or longer, and more preferably one minute or longer.

The heating time is preferably not longer than 20 minutes, and more preferably not longer than 10 minutes. Particularly, if the heating treatment is performed in an environment other than an inert gas atmosphere (for example, ambient air), the heating time is preferably not longer than 10 minutes, and more preferably not longer than 5 minutes, because heating for a prolonged period of time may change the nature of the sprayed coating 3 (FIGS. 1 and 2). For example, in the ambient air, the sprayed coating 3 may be oxidized to an unacceptable degree.

This makes it possible to maintain the temperature of the cylindrical portion 12 (FIGS. 1 and 2) below the $A_{C3}$ point and, at the same time, raise the temperature of the tip portion 11 with the build-up layer 2 formed thereon (FIGS. 1 and 2) to a level that is not lower than the $A_{C3}$ point.

Figure 6:
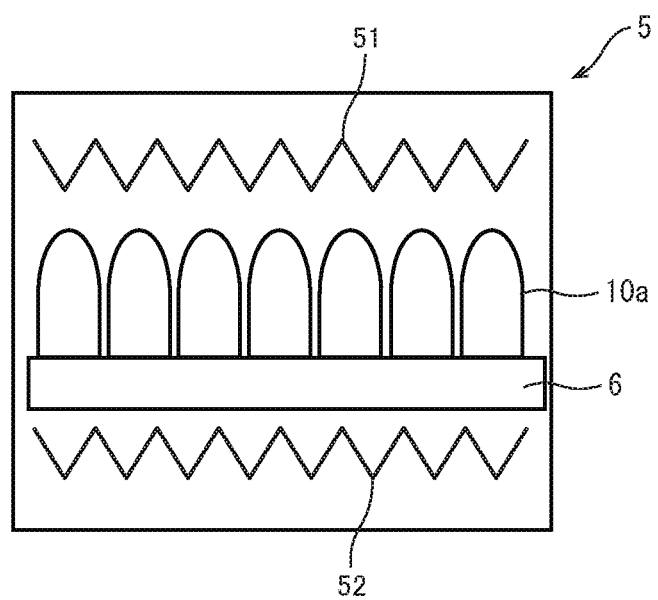
FIG. 6 is a schematic view of a heating apparatus different from the heating apparatus shown in FIG. 5.

In the example of FIG. 6, a heating apparatus 5 is used to heat the plug 10a. The heating apparatus 5 includes heaters 51 and 52. The heater 51 is located adjacent the top of the heating apparatus 5. The heater 52 is located adjacent the bottom of the heating apparatus 5.

The plug 10a is loaded into the heating apparatus 5. Preferably, a plurality of plugs 10a are loaded into the heating apparatus 5. A shield 6 is placed between the plugs 10a and heater 52. That is, the shield 6 is located above the heater 52 and the plugs are mounted on the shield 6. The shield 6 reduces transmission of heat from the heater 52 to the plugs 10a. The shield 6 may be shaped as a grid or a plate, for example. The shield 6 may be coated with an oxide.

The plugs 10a in the heating apparatus 5 are heated by the heaters 51 and 52. The heaters 51 and 52 may operate at the same heating temperature (preset temperature). Preferably, the heating apparatus 5 contains an inert gas atmosphere such as Ar. When the temperature of the tip portion 11 (FIGS. 1 and 2) with the build-up layer 2 formed thereon has reached a predetermined temperature that is not lower than the $A_{C3}$ point, the plugs 10a are removed from the heating apparatus 5. Since the shield 6 causes the amount of heat transmitted to the lower portion of each plug 10a to be smaller than the amount of heat transmitted to the upper portion of the plug 10a, the temperature of the cylindrical portion 12 (FIGS. 1 and 2) is lower than the temperature of the tip portion 11. At the time point when the plug 10a is removed from the heating apparatus 5, the temperature of the cylindrical portion 12 has not reached the $A_{C3}$ point and is below the $A_{C3}$ point.

The heating may be performed by the heating apparatus 5 without the shield 6. If this is the case, the heating temperature of the heater 52 located below the plugs 10a is adjusted to be lower than the heating temperature of the heater 51 located above the plugs 10a. This ensures that the amount of heat transmitted to the upper portion of each plug 10a is relatively large and the amount of heat transmitted to the lower portion of the plug 10a is relatively small. Thus, as is the case with the method using the shield 6, the plug 10a may be heated such that the temperature of the tip portion 11 (FIGS. 1 and 2) becomes not lower than the $A_{C3}$ point and the temperature of the cylindrical portion 12 (FIGS. 1 and 2) is below the $A_{C3}$ point.

A thermocouple may be attached to each of the tip portion 11 and cylindrical portion 12 of each plug 10a with the build-up layer 2 formed thereon in the heating apparatus 5 to measure the temperature of the associated portion. This makes it possible to detect that the temperature of the tip portion 11 has reached a predetermined temperature that is not lower than the $A_{C3}$ point while the temperature of the cylindrical portion 12 is below the $A_{C3}$ point, and remove the plug 10a from the heating apparatus 5 at a suitable moment. The temperatures of the tip portion 11 and cylindrical portion 12 need not be measured each time the heat treatment is performed. An appropriate heating time can be learned by performing the temperature measurement once, and this heating time can be used for plugs 10a of the same type.

(Cooling)

Lastly, the heated plug 10a is cooled. For example, the heating by the heating apparatus 4 or 5 is stopped and its door is opened to cool the plug 10a to a temperature not higher than 400° C. The plug 10a is typically cooled to room temperature. The cooling rate is only required to be sufficient to cause the plug to be hardened, and the plug may be left to cool or cooled at a higher rate.

This provides a finished piercer plug 10.

Effects of Embodiment

The manufacturing method of the present embodiment provides a build-up layer 2 on the tip portion 11 of the plug body 1. The build-up layer 2 has good high-temperature strength. This will prevent deformation of the tip portion 11 during piercing/rolling by the piercer plug 10.

According to the manufacturing method of the present embodiment, the build-up layer 2 is formed on the tip portion 11 of the plug body 11 before the tip portion 11 is heated to a temperature that is not lower than the $A_{C3}$ point.

Thus, even if heat input during the formation of the build-up layer 2 has produced variations in the hardness of plug body 1, the subsequent heating makes the hardness of the tip portion 11 uniform, thereby improving it. This will further prevent deformation of the tip portion 11 during the piercing/rolling, thereby providing good base-material deformation resistance.

According to the manufacturing method of the present embodiment, a sprayed coating 3 is formed on the surface of the plug body 1 with the build-up layer 2 formed thereon. The sprayed coating 3 has a higher thermal insulation than the build-up layer 2. The sprayed coating 3 prevents heat input to the plug body 1 during the piercing/rolling. This will prevent seizure on the piercer plug 10.

According to the manufacturing method of the present embodiment, when the build-up layer 2 and sprayed coating 3 have been formed, the tip portion 11 of the plug body 1 is heated to a temperature not lower than the $A_{C3}$ point. This causes diffusion between the sprayed coating 3 and the plug body 1 and build-up layer 2, improving the adhesiveness of the sprayed coating 3. This makes it possible to increase the thickness of the sprayed coating 3. Particularly, increasing the thickness T31 of the portions of the sprayed coating 3 that cover the tip portion of the piercer plug 10 which can easily be deformed will efficiently improve the base-material deformation resistance.

According to the manufacturing method of the present embodiment, the tip portion 11 is heated to a temperature that is not lower than the $A_{C3}$ point, while the cylindrical portion 12 is maintained at a temperature below the $A_{C3}$ point. This will improve the hardness of the tip portion 11 of the plug body 1 while preventing the decrease in the toughness of the cylindrical portion 12. This will prevent deformation of the tip portion 11 and cracking in the cylindrical portion 12 during piercing/rolling. This will improve the service life of the piercer plug 10.

While an embodiment has been described, the present disclosure is not limited to the above-described embodiment, and various modifications are possible without departing from the spirit of the disclosure.

EXAMPLES

To verity the effects of the present disclosure, piercing/rolling tests were conducted using a plurality of piercer plugs.

All the piercer plugs have the same plug body (1) shape and material in common. The chemical composition of the steel used for the plug body (1) is shown in Table 1. The balance of the chemical composition shown in Table 1 is Fe and impurities. In Table 1, the unit of the content of each element is mass %. Table 2 shows the conditions for each piercer plug.

TABLE 1

| C | Si | Mn | P | S | Cu | Ni | Cr | Mo | Co | W |
|---|----|----|---|---|----|----|----|----|----|---|
| 0.15 | 0.50 | 0.50 | 0.008 | 0.004 | 0.01 | 1.0 | 0.5 | 1.40 | <0.01 | 3.50 |

TABLE 2

| No. | Build-up layer | Presence/ Absence | Coating Type | Film thickness [μm] Reeling portion | Film thickness [μm] Rolling portion | Film thickness [μm] Tip portion | IH treatment | Remarks |
|---|---|---|---|---|---|---|---|---|
| 1 | absent | present | oxide scale | 500 | 500 | 500 | not done | comp. ex. |
| 2 | absent | present | sprayed | 300 | 500 | 1200 | not done | comp. ex. |
| 3 | absent | present | sprayed | 300 | 500 | 1200 | done | comp. ex. |
| 4 | present | present | sprayed | 300 | 500 | 1200 | not done | comp. ex. |
| 5 | present | absent | — | — | — | — | not done | comp. ex. |
| 6 | present | present | sprayed | 300 | 500 | 1200 | done | inv. ex. |
| 7 | present | present | sprayed | 300 | 650 | 1500 | done | inv. ex. |
| 8 | present | present | sprayed | 300 | 800 | 1800 | done | inv. ex. |
| 9 | present | present | sprayed | 300 | 1000 | 2000 | done | inv. ex. |

In Table 2, Piercer Plug Nos. 6 to 9 are the piercer plugs of inventive examples, while Piercer Plug Nos. 1 to 5 are the piercer plugs of comparative examples.

In each of Piercer Plug Nos. 6 to 9 which are the inventive examples, a build-up layer (2) of an Ni—W alloy (45% W, 3% Cr and balance, i.e. Ni) with a thickness of about 3 mm was formed on the tip portion (11) of the plug body (1). The length (L2) of the build-up layer (2) as measured in the axial direction was about 18% of the length (L) of the piercer plug as measured in the axial direction.

Further, in each of Piercer Plug Nos. 6 to 9, a sprayed coating (3) was formed on the entire surface except for the roll-off portion (13) by arc spraying using iron wire. In each of Nos. 6 to 9, the thickness of the portions of the sprayed coating (3) located in the reeling portion was 300 μm. In terms of the thickness of the portions of the sprayed coating (3) that are located in the rolling portion and the thickness (T31) of the portions of the spraying coating (3) covering the tip, No. 6<No. 7<No. 8<No. 9.

In each of Piercer Plug Nos. 6 to 9, after the build-up layer (2) and sprayed coating (3) were formed, the portions beginning with the tip portion and ending with the rolling portion were subjected to high-frequency induction heating (IH) treatment in an Ar 100% atmosphere. The heating temperature was in the range of 700 to 1100° C., and the heating time was in the range of 3 to 60 minutes. The cylindrical portion (12) was not subjected to IH treatment.

Nos. 1 to 5 were comparative examples. In each of Piercer Plug Nos. 4 and 5, a build-up layer (2) similar to those of Nos. 6 to 9 was formed. In Piercer Plug Nos. 1 to 3, no build-up layer (2) was formed.

In each of piercer plugs Nos. 2 to 4, a sprayed coating (3) similar to that of No. 6 was formed. In Piercer Plug No. 1, an oxide scale coating was formed by oxidizing heat treatment. No coating was formed on Piercer Plug No. 5.

Out of Nos. 1 to 5, Piercer Plug No. 3 was subjected to IH treatment similar to that for Nos. 6 to 9, while the other piercer plugs were not subjected to IH treatment.

Each of Piercer Plug Nos. 1 to 9 was used to repeatedly perform piercing/rolling on billets made of SUS 304.

Figure 7:
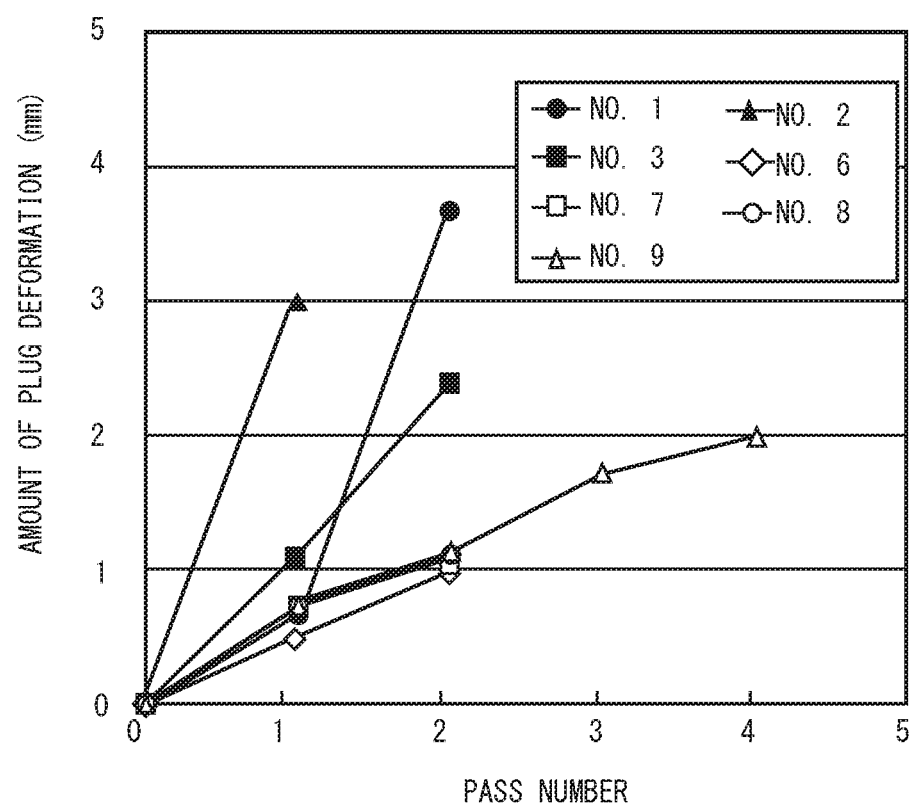
FIG. 7 is a graph showing the relationship between the amount of plug deformation and pass number for each of the piercer plugs of the inventive and comparative examples.

FIG. 7 shows the relationship between the amount of plug deformation and pass number for each of Piercer Plug Nos. 1 to 3 and 6 to 9. Amount of plug deformation means the amount of change in the sum of the length (L) of the piercer plug (10) and the thickness (T31) of the portions of the sprayed coating (3) that cover the tip, i.e. the length (L+T31), represented by the difference between the values before and after piercing/rolling.

As shown in FIG. 7, for Piercer Plug No. 1 which had an oxide scale coating formed thereon, the amount of plug deformation for the first pass was smaller than 1 mm, but the amount of plug deformation for the second pass was larger than 3 mm, causing complete erosion. This is presumably because the oxide scale coating on the surface of the piercer plug practically disappeared during the first pass.

Piercer Plug No. 2, which had no build-up layer (2) and had not been subjected to IH treatment, exhibited a wear of 3 mm after the first pass. This is presumably because the sprayed coating peeled off during the first pass. Piercer Plug No. 3, which had no build-up layer (2) but had a sprayed coating (3) and had been subjected to IH treatment, exhibited a wear of about 2 mm after the second pass. This amount of plug deformation is relatively large but can be considered good.

For Piercer Plug Nos. 6 to 9 which each had a build-up layer (2) and a sprayed coating (3) and had been subjected to IH treatment, the wear after the second pass was about 1 mm, which is small, and can be determined to be sufficiently capable of continued piercing. For Piercer Plug No. 9, whose coating on the tip was as large as 2000 μm, the amount of plug deformation after the fourth pass was about 2 mm, and this plug can be determined to be good after the fourth pass.

Figure 8:
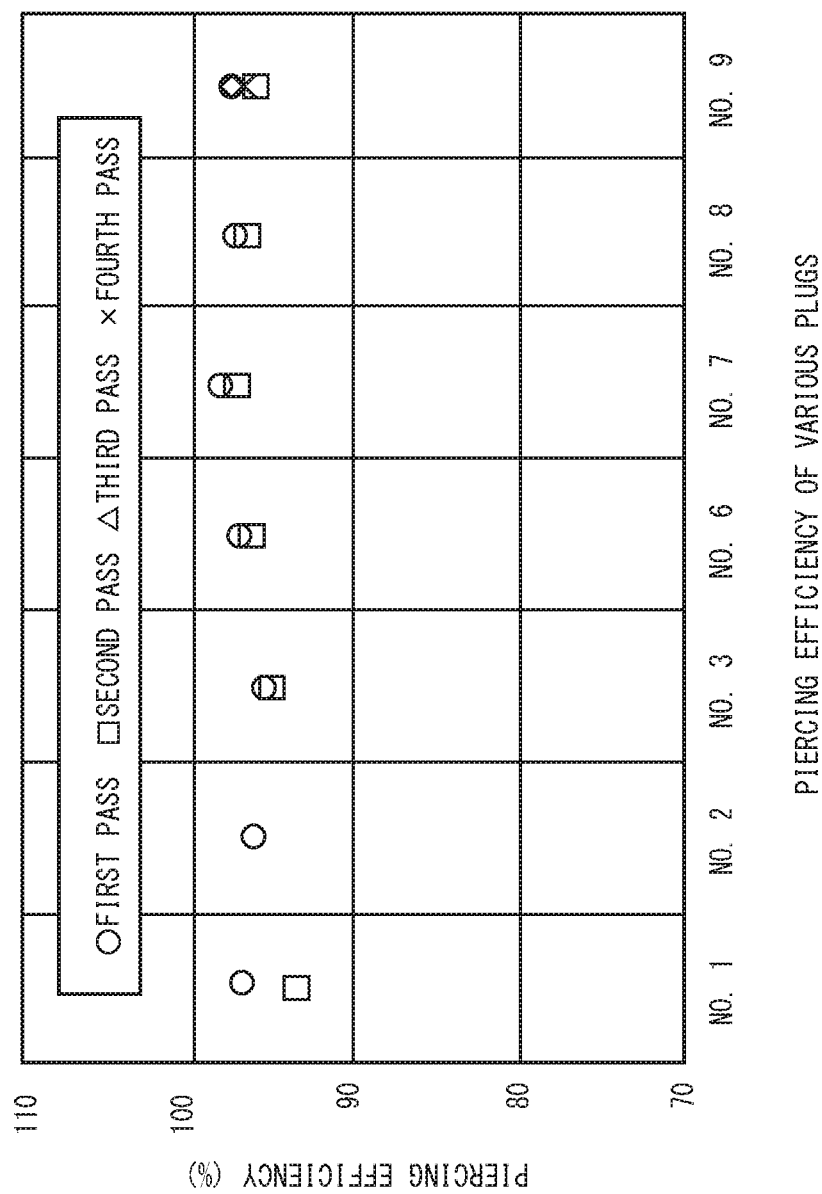
FIG. 8 is a graph showing the piercing efficiency for a pass number for each of the piercer plugs of the inventive and comparative examples.

FIG. 8 shows the piercing efficiency for a pass number for each of Piercer Plug Nos. 1 to 3 and Nos. 6 to 9. Piercing efficiency is defined as (actual speed of transportation of material)/(theoretical speed of transportation of material)× 100 [%]. The theoretical speed of transportation of the material can be calculated from the number of rotations of the piercer rolls. The actual speed of transportation of the material is affected by, for example, the friction resistance between the plug and material, and is lower than the theoretical speed of transportation which is calculated from the preset number of rotations of the piercer rolls. If the piercing efficiency is high, it means that the time required for piercing is short, meaning improvement of production efficiency. As shown in FIG. 8, piercing efficiency was high and stable at 95% or higher, except for the second pass for Piercer Plug No. 1, which experienced erosion.

Figure 9:
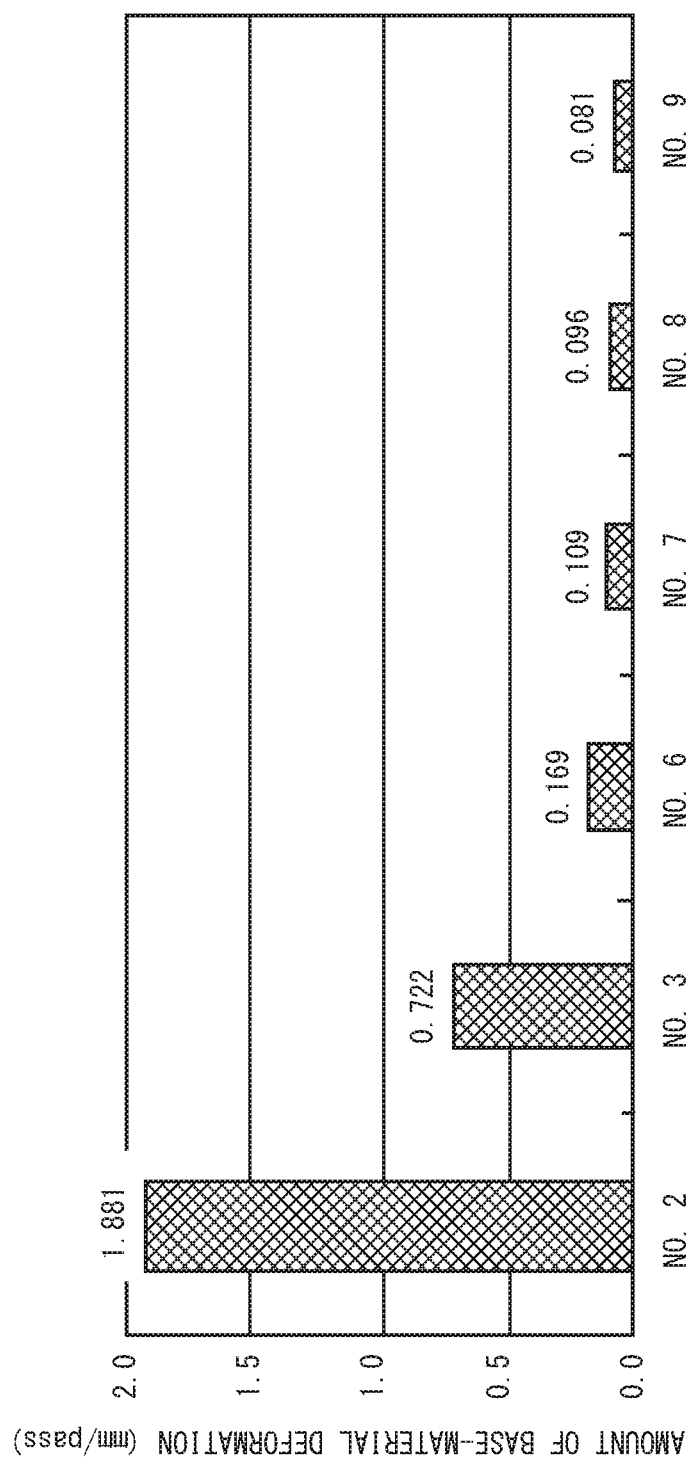
FIG. 9 is a graph showing the amount of base-material deformation per pass for each of the piercer plugs of the inventive and comparative examples.

FIG. 9 shows the amount of base-material deformation per pass for each of Piercer Plug Nos. 2 to 3 and Nos. 6 to 9. Amount of base-material deformation means the amount of change in the length (L) of the piercer plug (10), represented by the difference between the values before and after piercing/rolling. For Piercer Plug No. 2, the base material was discovered to have been deformed by as much as about 1.9 mm/pass. For Piercer Plug No. 3, the amount of base-material deformation was about 0.7 mm/pass. For each of Piercer Plug Nos. 6 to 9 which had a build-up layer (2) and had been subjected to IH treatment, the amount of base-material deformation was in a range of 0.08 to 0.16 mm/pass, which means very small values.

A comparison between Nos. 3 and 6 which had the same coating conditions but were different in terms of the presence of a build-up layer (2) shows that the amount of base-material deformation of Piercer Plug No. 6, which had a build-up layer (2), was smaller than the amount of base-material deformation of Piercer Plug No. 3, which had no build-up layer (2).

A comparison between Nos. 6 to 9 which were only different in terms of the coating conditions shows that the larger the thickness of the sprayed coating (3), the smaller the amount of base-material deformation becomes. This is presumably because increasing the thickness of the sprayed coating (3) provided improved thermal insulation.

For Piercer Plug No. 4 which had a build-up layer (2) and a sprayed coating (3) but had not be subjected to IH treatment, the sprayed coating (3) peeled off during the first pass, resulting in flaws on the inner surface of the opposite material, i.e. pipe. This is presumably because sufficient adhesiveness between the build-up layer (2) and sprayed coating (3) was not achieved since IH treatment had not been performed.

Piercer Plug No. 5 which had a build-up layer (2) but no sprayed coating (3) and had not been subjected to IH treatment had decreased piercing efficiency, and became unable to pierce due to plug clogging. This is presumably because the absence of a sprayed coating (3) resulted in low seizure resistance.

For Piercer Plug Nos. 4 and 5, it was impossible to determine the amount of base-material deformation because other problems occurred before the base material was deformed. Nevertheless, it can be easily assumed that the base material of each of Piercer Plug Nos. 4 and 5, which had not been subjected to IH treatment, had a lower hardness than those for Piercer Plug Nos. 6 to 9, which had been subjected to IH treatment.

This demonstrates that forming a build-up layer (2) on the portions of the piercer plug beginning with the tip and ending with the rolling portion and heating these portions can provide a piercer plug with excellent base-material deformation resistance and seizure resistance.

The invention claimed is:

1. A method of manufacturing a piercer plug comprising the steps of:
   preparing a plug body including a tip portion and a cylindrical portion having a hole usable to attach a bar and located rearward of the tip portion;
   forming a build-up layer on a surface of the tip portion; and
   heating the plug body such that a temperature of the tip portion with the build-up layer formed thereon is not lower than an austenite transformation temperature and a temperature of the cylindrical portion is lower than the austenite transformation temperature,
   the build-up layer being formed of an Ni—W alloy containing 25 to 50 mass % W and 1 to 5 mass % Cr.

2. The method of manufacturing the piercer plug according to claim 1, further comprising the step of forming a sprayed coating on a surface of the plug body with the build-up layer formed thereon before the step of heating.

* * * * *